United States Patent Office 3,453,426
Patented July 1, 1969

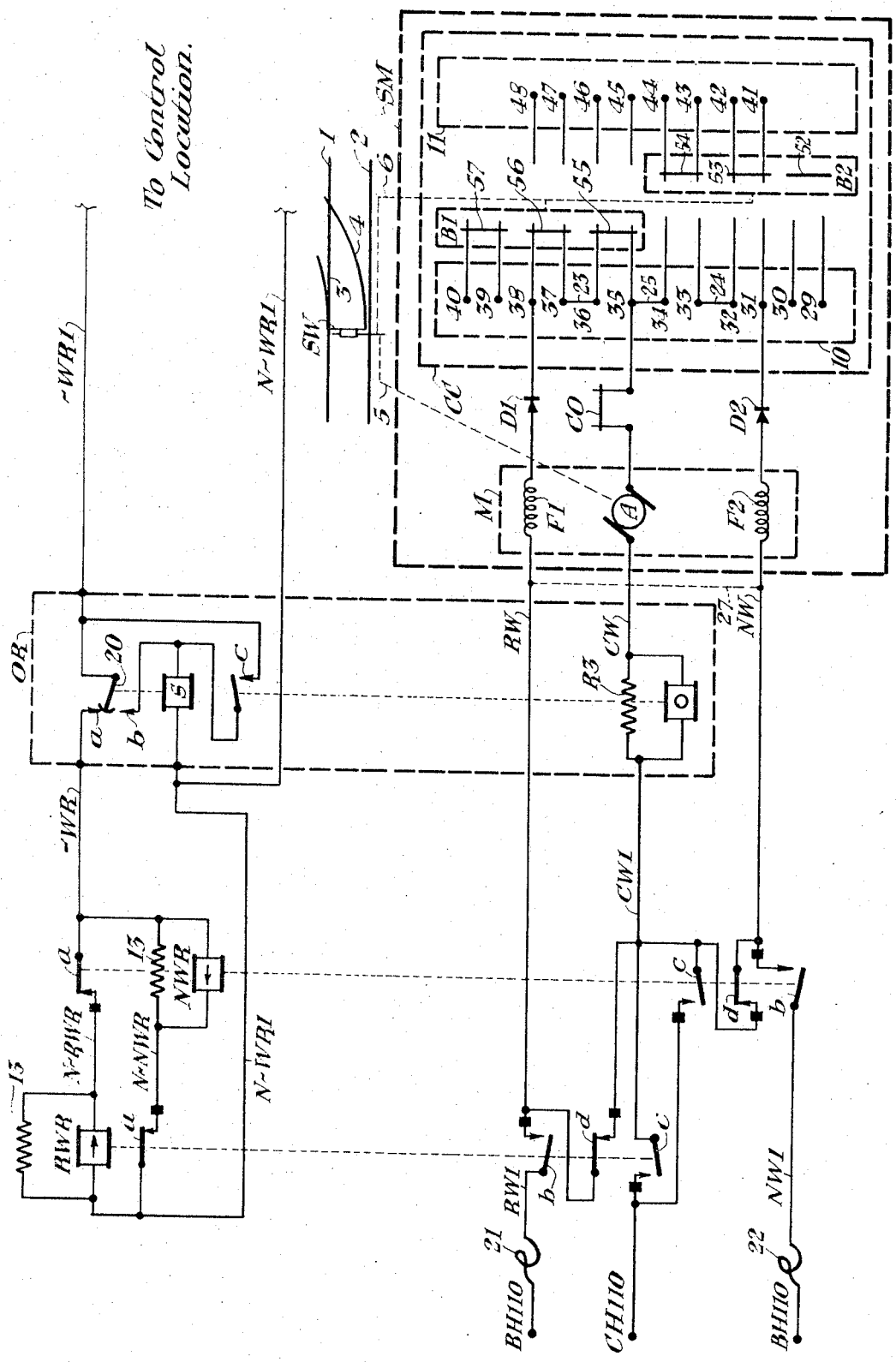

3,453,426
CROSS AND GROUND PROTECTION FOR
RAILWAY SWITCH MACHINES
George M. Prentice, Pittsburgh, Pa., assignor to Westinghouse Air Brake Company, Swissvale, Pa., a corporation of Pennsylvania
Filed Sept. 22, 1966, Ser. No. 581,247
Int. Cl. B61l 19/06
U.S. Cl. 246—242                    20 Claims

ABSTRACT OF THE DISCLOSURE

This disclosure relates to a cross and ground protection arrangement for an electrical railway switch machine employing a split field direct current motor for moving the switch points between their two extreme positions. A fused three-wire motor supply circuit is selectively controlled by a relay control circuit having a plurality of contacts for selectively energizing either the normal or the reverse operating circuit of the split field motor under normal operating conditions and for electrically interrupting the motor supply circuit when a cross or ground fault occurs on the outside wires of the normal and reverse operating circuits.

---

My invention relates to a cross and ground protection arrangement and more particularly to a circuit arrangement for providing cross and ground protection for electrically operated railway switch machines.

A power operated railway switch machine generally comprises an electrical motor which may be controlled from a remote point to move the switch points of the switch machine between their two extreme positions, namely, between their reverse and normal positions, and thereafter locking the points in the extreme position to which they have been moved. Normally, such railway switch machines also include a circuit controller which is operated in part by a slide bar and a point detector mechanism for controlling suitable electrical indication and motor control contacts which indicate when the switch points are properly positioned and locked in, for example, the reverse position, and which establish the appropriate motor control circuit whereby the switch machine may be moved to its normal position when desired, and vice versa. In the movement of the switch points between their two extreme positions, the switch machine experiences an initial unlocking stroke, an intermediate operating stroke and a final locking stroke. During the initial unlocking stroke, the switch points are unlocked by retracting a locking dog from a suitable latching locking notch situated in the lock rod, and the circuit controller assumes a mid-stroke position which permits the return of the switch machine to its original position should the occasion arise. The circuit controller remains in its mid-stroke position during the entire operating stroke in which the switch points are moved from one to the other of their extreme positions. Upon completion of the operating stroke, the final locking stroke commences in which the locking dog of the slide bar is protracted into an appropriate locking notch located in the lock rod. Now upon completion of the locking stroke, the circuit controller interrupts, for example, the reverse motor control and reverse shunting indication contacts but closes the reverse indication contacts thereby signifying that the switch points are properly positioned and locked in their reverse position. It is quite obvious that the switch machine operates in a converse manner when it is desirable to move the switch points from their reverse to their normal position.

It has been found that an electrical railway switch machine employing a three-wire type of motor operating circuit and utilizing a split field direct current motor for electrical operation of the switch machine is susceptible to various malfunctions which may produce a dangerous condition under certain circumstances. Such a hazardous or perilous condition may arise either due to an undetected cross existing between the two outside connected wires, or due to a faulty ground existing on these wires of the motor operating circuits. It will be noted that the circuit controller of the switch machine establishes or completes a circuit path between the armature and each field of the split field motor except when the machine is in either of its two extreme positions. That is, in a three-wire motor circuit arrangement the reverse and normal field windings are interconnected with the armature of the motor by the circuit controller during the entire operating stroke so that the switch points may be either moved to the desired position or returned to their original position, if desired. The circuit controller remains in its mid-stroke position until the switch machine assumes either one of its two extreme positions and then appropriately interrupts the proper motor circuit and establishes the proper indication circuits, thereby designating that the switch machine is properly positioned and locked in its desired extreme position. For example, when it is desirable to move the switch points from their normal to their reverse position, the circuit controller interrupts the reverse indication contacts and establishes the normal motor control circuit during the initial unlocking stroke of the railway switch machine. The circuit controller remains in this position until the switch points assume their reverse position and are properly locked therein whereupon the reverse motor control circuit is interrupted and the normal indication circuits are completed. It is quite obvious that the switch machine and, in turn, the circuit controller operates in a reverse manner when it is desirable to move the switch points from their reverse to their normal position. In each case the circuit controller assumes its mid-stroke position and remains therein until the switch machine and particularly the switch points are properly positioned and locked in either their reverse or normal positions. It has been found that a cross existing between, or a ground existing, on the outside wires of the normal and reverse motor operating circuits either causes the switch machine to oscillate between its two extreme positions or results in a braking action which stops the motor in mid-stroke so that the switch points remain open and unlocked. It is quite obvious that either of these adverse conditions could result in injury and damage to both personnel and equipment. Accordingly, it is critically important to exercise every precaution and to employ appropriate apparatus or equipment which will preclude and prevent the occurrence of such hazardous conditions.

Therefore, it is an object of my invention to provide a unique cross and ground protection arrangement for electrically operated railway switch machines.

It is a further object of my invention to provide an improved cross and ground protection for a three-wire motor operating circuit.

A further object of my invention is to provide a split field motor operated circuit with cross and ground protection which precludes and prevents motor oscillating effect and motor braking effect.

Yet another object of my invention is to provide a unique cross and ground protection along with protection against overload conditions for a direct current split field motor operated railway switch machine.

Still another object of my invention is to provide a unique cross and ground protected railway switch machine having supply source short-circuiting protection means.

A still further object of my invention is to provide a unique three-wire motor operating circuit for a split field motor operated railway switch machine which eliminates both oscillating and braking of the motor during the occurrence of a cross or ground on the outside wires of the motor operating circuits, thereby preventing the possibility of the switch points being left openend and unlocked.

Still yet another object of my invention is to provide an improved circuit arrangement for railway switch machines which is simple in design, economical in construction, efficient in operation, and endurable in use.

Briefly, in accordance with the present invention I provide a unique circuit arrangement for an electrical railway switch employing a split field direct current motor for moving the switch points between their normal and reverse positions. This circuit arrangement includes a three-wire motor supply circuit having a normal motor operating circuit and a reverse motor operating circuit. The motor supply circuit is controlled by a control circuit which includes a normal control relay having a plurality of contacts electrically interconnected with the normal motor operating circuit for energizing and deenergizing the split field motor as the normal control relay is picked up and released and which includes a reverse control relay having a plurality of contacts electrically interconnected with the reverse motor operating circuit for energizing and deenergizing the split field motor as the reverse control relay is picked up and released. The control relays are so arranged and constructed to insure that each relay is released prior to permitting the other relay to become energized thereby preventing the possibility of inadvertently short circuiting the motor supply source. An overload relay is electrically interconnected with the motor supply circuit and the control circuit and functions to interrupt the control circuit which in turn deenergizes the motor operating circuit during an overload condition. The motor operating circuit is suitably fused and the plurality of relay contacts are so arranged that the motor operating circuit is immediately interrupted by the destruction of the fused element when a cross or ground exists between or on the normal and reverse motor operating circuits. A diode is electrically interconnected between the motor armature and the field winding of the normal and reverse motor operating circuits for preventing the possibility of both field windings from being energized during a normal motor operation in which the switch points are being moved from one to the other extreme positions.

I shall describe one form of a unique circuit arrangement embodying my invention, and shall then point out the novel features and advantages thereof in the claims.

The above objects and other attendant features and advantages of my invention will become more fully evident from the following detailed description when considered in connection with the accompanying drawing.

The single accompanying drawing is a diagrammatic view of a control circuit embodying my invention for an electrically operated railway switch machine.

Referring now to the single figure of the drawing, the reference character SW designates the railway switch comprising two stock or fixed rails 1 and 2 along with two movable switch points 3 and 4. The switch points 3 and 4 are interconnected with the switch machine or operating mechanism SM and are moved between the normal and reverse position by means of a throw bar 5 which is suitably connected to the switch points. The switch machine SM may be of the type shown and disclosed in copending application for Letters Patent of the United States, Ser. No. 515,875, filed Dec. 23, 1965 now Patent No. 3,396,270, issued Aug. 6, 1968, by Ralph W. Kugler and Robert A. Wenston, for A Circuit Controller for Railway Switch Machines, which is assigned to the same assignee as the present application. The switch machine SM comprises a suitable motor M for driving the movable points of the track switch between their normal and reverse positions and a circuit controller CC which is operated in accordance with the position of the switch points.

The circuit controller CC which is operatively connected to the railway switch SW, as illustrated by the dotted line 6, includes an electrical contact assembly and an associated mechanical coupling assembly, as is shown and described in more detail in the above referred to application, Ser. No. 515,875. The contact assembly comprises a plurality of fixed contacts 29–40 and 41–48 which are conveniently mounted on a pair of suitable terminal boards 10 and 11, respectively. These fixed or stationary contacts are suitably electrically connected or wired to the drive motor M, for example, a 110-volt direct current split field motor having an armature A and a pair of field coils F1 and F2, as will be described in greater detail hereinafter, and to a plurality of signal control relays. Cooperatively associated with the fixed contacts are a plurality of movable contacts 52–54 and 55–57 which are conveniently mounted on suitable contact blocks B2 and B1, respectively, and which are selectively moved into an out-of-electrical contact with selected pairs of the fixed contacts 29–48.

As shown, the railway switch SW and the switch machine or operating mechanism SM are both in the normal position. That is, the movable contacts and the fixed contacts of the circuit controller are arranged in positional agreement with the movable switch points 3 and 4 as illustrated in the drawing. The electrical contacts of the circuit controller CC are arranged in two groups with the electrical condition of each group being independently and separately controlled by the specific position assumed by its associated movable contact block. The first group consists of fixed contacts 29–34 and 41–44 which cooperate with movable contacts 52–54, while the second group consists of fixed contacts 35–40 and 45–48 which cooperate with movable contacts 55–57. In the illustrated right-hand switch layout in which the left-hand point is normally closed, the fixed contacts 29–30 and 39–40 are the normal and reverse shunting indication contacts, respectively. The contacts 29–30 and 39–40 which are selectively bridged by movable contacts 52 and 57, respectively, function to short circuit the normal and reverse signal control relays for eliminating the possibility of stray currents or crosses on external leads from energizing the related relays improperly and causing an improper signal indication. The contacts 31–34 and 35–58, which are cooperatively associated with the bridging contacts 53–54 and 55–56, respectively, are suitably connected to the normal and reverse motor control circuits, as will be described in greater detail hereinafter. The contacts 41–44 and 45–48, which are also cooperatively associated with movable bridging contacts 53–54 and 55–56, respectively, are suitably connected to the normal and reverse indication circuits.

It is noted that the railway switch machine may be controlled from a location situated either remotely from or adjacent to the railway switch SW. The switch control circuit includes a normal control relay NWR for controlling the normal operation of the railway switch SW, and a reverse control relay RWR for controlling the reverse operation of the railway switch SW. The control relays NWR and RWR are preferably of the polar biased type which include magnetic blowout for the electrical contacts. These relays are arranged to be energized and picked up when current flows through their associated windings in the appropriated direction, as signified by the respective arrows. Each winding of the control relays NWR and RWR is shunted by a snubbing resistor 13 which provides a slow drop-away of release feature for these relays. The purpose of these various relay features and characteristics will be described in greater detail hereinafter. As shown, the control relays NWR and RWR are connected in multiple through their respective back contacts a. That is, the one side, namely, the left side viewing the drawing, of the winding of relay NWR is connected to the corresponding side of the winding of reverse control relay RWR by lead N–NWR and back contact a of relay RWR. Similiarly, the other side, namely, the right side viewing the drawing, of the winding of relay RWR is connected to the corresponding side of the winding of relay NWR through lead N-RWR and back contact $a$ of relay NWR. The respective sides of each winding are in turn connected to the leads -WR and N-WR1. The lead -WR is connected to the back contact $a$ of the overload relay OR, to be described presently, which in turn is connected to the lead -WR1 through contact arm 20. The leads -WR1 and N-WR1 are connected through a conventional type of locking, correspondence, and switch control stick relays to a suitable direct current supply source through a reversible control mechanism, such as a lever operated pole changer which may be conveniently located at the control location.

As shown, the overload relay OR includes a pickup or operating winding O and a stick winding S. The pickup winding O is connected in series with the armature A of motor M and connected in multiple with a resistor R3. The winding O and resistor R3 are common to both the normal and the reverse motor operating circuits, as will be described in greater detail hereinafter. The resistor R3 preferably has a relatively high positive temperature coefficient of resistance so that the resistance of this resistor increases as its temperature increases. The parts are so constructed and proportioned that, when the motor is operating normally, most of the motor current flows through resistor R3 and little, if any, flows through the pickup winding O. Accordingly, under normal conditions the relay OR remains released. However, when an overload condition exists such as produced by an obstructed track switch, the motor current becomes relatively large and the resistor R3 quickly heats up to proportionally increase its resistance so that most of the motor current begins to flow through the pickup winding O, which will result in the relay OR picking up. The winding S of the relay OR is included in a stick circuit for the relay OR, which circuit will be traced hereinafter. The relay OR also includes a special contact structure which is usually referred to as a make-before-break or close-before-open contact, as is symbolically shown in the drawing. This contact structure comprises a contact arm 20 which cooperates with a back contact $a$ and front contact $b$ of relay OR. The contact arm 20 is normally biased to a position in which it engages the back contact $a$ so that a circuit is completed between lines -WR and -WR1. When the relay OR and in particular the stick winding S becomes energized to the point where its armature picks up, the first part of the movement of the stick armature causes contact arm 20 to move into engagement with the front contact $b$ so that the back contact $a$ and the front contact $b$ are both closed, but the subsequent movement of the stick armature causes the contact arm 20 to move out of engagement with the back contact $a$. Accordingly, the front contact $b$ is closed before the back contact $a$ is opened. The opening of back contact $a$ by contact arm 20 interrupts the circuit to the normal and reverse control relays NWR and RWR.

It will be noted that the energization of the winding O of the relay OR causes the front contact $c$ of the relay OR to become closed so that an energizing circuit is provided for the stick winding S. This contact arrangement insures that overload relay OR is positively energized or picked up by winding S prior to interrupting the energy to the motor operating circuits by the switch control circuits and in turn to the operating winding O of the overload relay OR by the energization of the stick winding of the overload relay. Accordingly, the motor operating circuits are positively interrupted during an overload condition and remain interrupted until the appropriate action is taken by authorized personnel for overriding the overload relay.

Referring now to the motor operating circuits, it will be noted that a three-wire circuit arrangement is employed in supplying energy to the split field direct current motor M of the switch operating mechanism SM. This three-wire circuit is shown appropriately connected to a pair of positive terminals and a negative terminal of a suitable source of direct current voltage, such as a 110-volt power supply, the terminals being designated BH110 and CH110. The positive BH110 terminals are directly connected to suitable fuses having similar current ratings and time-lag characteristics which will allow the fuses to blow when a short-circuited condition exists across terminals BH110 and CH110 but which will not allow the fuses to blow before the overload relay OR picks up if an obstruction is encountered by the switch, as will be described in greater detail hereinafter. It is understood that while separate fuse elements, namely, fuses 21 and 22 are shown interconnected between leads RW1 and NW1 and terminal BH110, a suitable single fuse element may suffice in cases where wires NW1 and RW1 are interconnected to a common fused wire which is connected to positive terminal BH110 of the motor supply source.

Referring now to the separate motor operating circuits, it will be noted that a first circuit is employed in energizing the motor for moving the switch points to their reverse position and a second circuit is employed in energizing the motor for moving the switch points to their normal position. The first circuit which may be conveniently termed the reverse motor operating circuit extends from the upper positive BH110 terminal of the supply source through fuse 21, wire RW1, over the front contact $b$ of relay RWR, through line RW, field F1, diode D1, fixed contact 38, movable contact 56, fixed contact 37, jumper 23, fixed contact 36, movable contact 55, fixed contact 35, over manual cutout motor contact CO, through armature A, wire CW, resistor R3 and winding O in multiple, wire CW1, front contact $c$ of relay RWR to the negative terminal CH110 of the supply source. The second circuit which may be conveniently termed the normal motor operating circuit extends from the lower terminal BH110 through fuse 22, line NW1, over front contact $b$ of relay NWR, through line NW, field F2, diode D2, fixed contact 31, over movable contact 53, through fixed contact 32, jumper 24, fixed contact 33, over movable contact 54, through fixed contact 34, jumper 25, fixed contact 35, over motor cutout contact CO, through armature A, wire CW, resistor R3, wire CW1, over front contact $c$ of relay NWR to terminal CH110 of the supply source. It is quite apparent that the reverse and normal motor operating circuits are under the direct control of the reverse and normal control relays RWR and NWR, respectively. Further, it may be noted that each of the control relays NWR and RWR also includes a normally closed back contact $d$ interposed between the control wires of the two motor operated circuits. For example, back contact $d$ of relay RWR is interconnected between the RW wire and the CW1 wire of the reverse operating circuit, while the back contact $d$ of relay NWR is interconnected between the NW wire and the CW1 wire of the normal operating motor circuit. These back contacts are effective in short-circuiting the supply source and causing the respective fuses to immediately blow when a cross or ground exists on wires NW and RW so that the motor is incapable of unlocking and moving the switch points from either of their extreme positions, as will be described hereinafter.

It will be noted that the asymmetrical conducting elements or diodes D1 and D2 are arranged such that the anodes are connected to the positive BH110 terminals through the respective fields F1 and F2 of motor M, while the cathodes are directly connected to the fixed terminals 36 and 31, respectively, of the circuit controller CC. It will be noted that with the polarity of diodes D1 and D2 arranged in such a direction, the motor operating circuit corresponding to the particular request command is permitted to be established but the opposite motor operating circuit, and particularly the field winding of the opposite motor operating circuit is prevented from being energized during mid-stroke operation, as will be described hereinafter.

Having thus described the electrical interconnections of the various elements, it will now be assumed that all the necessary adjustments have been made so that the railway switch is operating properly and that the various elements of the switch machine are in their normal position with the movable switch point 3 engaging the fixed rail 1 as shown in the drawing. If it is now desirous to move the switch SW to its reverse position, the operator may do so by supplying the proper polarity of voltage to the −WR1 and N−WR1 wires of the control circuit which may be accomplished by simply moving the reversible control lever to its reverse position. The movement of the control lever to its reverse position causes energy to be supplied to the control circuit wherein current flows through the winding of the reverse control winding RWR in the proper direction, as indicated by the arrow, thereby energizing the reverse control relay RWR. That is, current flows from the positive terminal of the supply source through wire N−WR1, the winding of reverse control relay RWR, wire N−RWR, over the back contact a of relay NWR, through wire −WR, over the back contact a and contact arm 20 of the overload relay OR, through the wire −WR1 and back to the negative terminal of the supply source. It will be noted that the direction of current flow is opposite to that required by the normal control relay NWR and therefore the current has no effect on the normal control relay NWR. Under this condition, the normal control relay NWR remains deenergized, but the relay RWR is effectively energized and becomes picked up so that back contacts a and d are opened and front contacts b and c are closed. The closing of front contacts b and c completes or establishes the reverse motor operating circuit which extends from the terminal BH110 through fuse 21, wire RW1, over front contact b, through wire RW, field F1, diode D1, fixed contact 36, over movable contact 56, through fixed contact 37, jumper 23, fixed contact 36, over movable contact 55, through fixed contact 35, over the normally closed motor cutout contact CO, through armature A, wire CW, resistor R3 and winding O in multiple, wire CW1, over front contact c to terminal CH110. Thus, the motor armature A and the field F1 are energized in series and the various parts are so arranged that the motor M operates and moves the track switch SW toward its reverse position. As previously mentioned, the switch machine undergoes an initial unlocking stroke wherein the motor M simply unlocks the switch points and moves the circuit controller CC to its mid-stroke position. That is, the initial angular rotation of the armature A of the motor M causes the movable contact block B2 to move to the left, as viewed in the drawing, thereby causing the circuit controller CC to assume a mid-stroke position. This movement of the contact block B2 results in the interruption of the normal indication contacts 41–44 by the movable contacts 53–54 but results in the closure of the normal motor operating circuit contacts 31–34 by movable contacts 53—54 and of the normal shunting indication contacts by movable contact 52. It will be noted that current is prevented from flowing through field winding F2 during this time by the diode D2 which inhibits the passage of any reverse current flow. That is, while a circuit is established between contact 35 and wire CW1 by contacts 31—34 and contacts 53—54 and back contact d of relay NWR through wire NW for field winding F2, no current flows through this circuit due to the high impedance characteristic of diode D2.

However, it will be appreciated that the closure of the normal motor control contacts 31–34 permits an operator to return the switch machine to its normal position should conditions demand such a restoration. To achieve such a restoration, the operator simply has to move the control lever to its normal position so that a reverse polarity of voltage is applied to the control circuit. That is, the direction of supply current to the control circuit is reversed. Under this condition the reverse control relay RWR immediately becomes deenergized and upon its release the normal control relay NWR becomes energized. As previously mentioned, since the control relays are slow-to-release due to the snubbing action of the resistors 13, the control relay NWR cannot become energized until the control relay RWR releases. That is, the normal control relay NWR is incapable of becoming energized until the back contact a of relay RWR becomes closed upon release of the reverse control relay RWR. This back or cross-checking feature along with the snubbing action of resistor 13, which provides a snap-action release of the control relays, insures that the terminals BH110 and CH110 of the motor supply source are prevented from being short-circuited when a reversal request command is initiated during a time the switch machine is in its operating or mid-stroke position. It will also be noted that the magnetic blowout feature substantially eliminates any arcing during the opening of the motor control contacts and therefore additionally reduces the possibility of short-circuiting the terminals of the motor supply source. Upon release of the reverse control relay RWR, the normal control relay NWR becomes energized over a circuit path extending from the positive terminal of the control source through wire −WR1, over contact arm 20 and back contact a of relay OR, through wire −WR, winding of relay NWR, wire N−NWR over back contact a of relay RWR, and through wire N−WR1 to the negative terminal of the control source. Accordingly, the resulting energization of the normal control relay NWR completes the normal motor operating circuit extending from the terminal BH110 of the motor supply source through fuse 22, wire NW1, over front contact b of relay NWR, through wire NW, field F2, diode D2, fixed contact 31, over movable contact 53, through fixed contact 32, jumper 34, fixed contact 33, over movable contact 54, through fixed contact 34, jumper 25, fixed contact 35, over the motor control cutout contact CO, through armature A, wire CW, resistor R3 and winding O in multiple, wire CW1, over contact c of relay NWR, back to terminal CH110 of the motor supply source. It will be noted that the diode D1 functions to prevent any current from flowing through field winding F1 during this time, in the same manner as described in relation to diode D2. The resulting energization of the normal motor operating circuit causes the armature A of the motor M to rotate in a direction such that the switch points are now driven to their normal position. Upon completion of the switch point movement or operating stroke, the locking stroke of the switch operation commences. Accordingly, when the switch points are properly positioned and locked in their normal position, the normal motor control contacts and reverse shunting indication contacts are interrupted by the movable contacts 53, 54 and 52, respectively, while the normal indication contacts 41–44 become closed by movable contacts 53–54 thereby signifying that the switch machine is properly positioned and locked in its normal position. Accordingly, the interruption of the normal motor operating contact deenergizes the motor M and thereafter the normal motor control circuit may be deenergized.

Let us again assume that the operator has instituted a reverse request command, that the reverse motor control circuit has been energized and that the switch machine has already assumed its mid-stroke position. Accordingly, under this condition the motor is moving the switch points to their reverse position. Upon the completion of the switch point movement, the locking stroke or portion of the switch operation commences. If the switch points are properly positioned in their reverse position, the lock dog enters the locking notch in the lock rod, and the switch is properly locked in its reverse position. With the switch points properly positioned and locked, the circuit controller CC undergoes a positional change, and more particularly, the movable contact block B1 is moved from its left-hand to its right-hand position, as viewed in the drawing. The movement of the contact block B1 results in the interruption of reverse motor control contacts 35–38 by movable contacts 55–56 and of the reverse shunting indication contacts 39–40 by the movable contact 57 and results in the closure of reverse indication contacts 45–48 by movable contacts 55–56. The opening of reverse motor contacts 35–38 interrupts the reverse motor control operating circuit so that motor M is deenergized. The closure of the 45–48 contacts suitably energizes the clear indication signal circuit thereby signifying that the switch points have been properly moved to their reverse position and have been positively locked therein. Accordingly, the switch points have undergone a complete reversal of positions, and the reverse control circuit may be automatically deenergized.

It is readily evident that in order to restore the switch points to their normal position from the reverse position it is simply necessary to move the control lever to its normal position to energize the normal control circuit which in turn completes the normal motor operating circuit, in the manner as described above. The energization of the normal motor operating circuit causes the armature to rotate in an opposite direction which in turn causes substantially the same sequence of switch operation, namely, unlock, operate, and lock, as described above. The entire operation is substantially the reverse as described above, but with the exception that the movable contact block B1 is moved rather than movable contact block B2 in order to initially interrupt the reverse indication contacts 45–48.

As is evident from the foregoing description, it is not possible for the reverse or normal indication contacts to be closed thereby representing a cleared signal to traffic until the switch points have been properly positioned and have been positively locked therein. That is, if for any reason the switch machine fails to complete its stroke, the movable contact blocks B1 and B2 are held in their left-hand extreme position corresponding to the mid-stroke position of the switch machine, as shown in the drawing, so that a clear indication signal is incapable of being produced. For example, let us assume that the switch is approaching its reverse position, as described above, and the switch points encounter an obstruction which prohibits any further movement. It is quite apparent that in this event the motor becomes overloaded and therefore draws an exceedingly high amount of current so that resistor R3 becomes overheated. The overheating of resistor R3 increases its resistive value proportionally and more current is permitted to flow through pickup winding O of the overload relay OR. Upon exceeding a predetermined value the overload relay OR is picked up by the energization of the pickup winding O. The energization of pickup winding O closes front contact c which establishes a circuit path for the stick winding S of the overload relay. The energization of the stick winding S results in the picking up of contact arm 20 so that front contact b becomes initially closed and eventually back contact a becomes opened. The closure of front contact b provides a stick circuit for relay OR and the opening of back contact a of relay OR results in the deenergization of the reverse motor control circuit by interrupting the circuit to relay RWR. Accordingly, the reverse control relay RWR releases and results in the interruption of the reverse motor operating circuit. The switch machine remains in this condition until an appropriate action is taken by the operator to deenergize the stick winding of the overload relay OR. The operator may attempt to free the switch machine by alternately energizing the normal and reverse motor control circuits or may return the switch points to their normal position and thereafter notify a maintainer of the obstruction. It is quite evident that should an obstruction occur during the opposite operating condition, the overload relay operates in an identical fashion in interrupting the normal motor control circuit as well as the normal operating motor circuit so that security and safety of the apparatus is always insured.

It will be noted that certain wires of the motor operating circuit, namely, outside wires NW and RW, as well as common wires CW, normally extend from a suitable relay wayside case or housing situated along the track at some selected point to the casing of the switch machine SM which is located adjacent the track switch SW. Accordingly, these three wires are generally exposed to all the elements of nature as well as to all the impediments of creatures which could cause various faults, such as crosses and grounds, between and on these wires. It has been found that special precautions must be taken to insure against such faults regardless of their origin since they can produce a dangerous condition which may result in damage to the equipment as well as injury to individuals. It is quite obvious that any condition which causes the switch points to become improperly positioned and remain unlocked is not only undesirable but also intolerable. Under some circumstances, these cross and ground faults may cause the motor to oscillate between its normal and reverse position until the overload relay picks up and deenergizes the motor or may result in a bucking action and therefore a braking effect to be set up between the two fields of the motor, whereby the armature is immediately stopped in a mid-stroke position so that the switch points remain unlocked.

Further, it has been found once the switch has been stopped in mid-stroke during the presence of a cross or ground on the NW and RW wires, the operator loses complete control of the switch and is unable to even return the switch points to their original position. That is, during such a failure the operator is normally unable to move the switch points since the energization of either control circuit results in the energization of both field windings and therefore the motor armature is incapable of moving in either direction. This problem has been overcome and avoided in the present application by uniquely employing and interposing a diode D1 or D2 between the armature A and each field winding F1 or F2 of the motor M and by electrically interconnecting each of the outside fused wires NW and RW to the common wire CW1 of the motor operating circuits through a normally closed back contact d of each of the control relays NWR and RWR. It will be noted that such an arrangement precludes the possibility of the switch points remaining in an unreturnable unlocked position during a cross or a ground condition. The present arrangement prohibits any movement to occur in the switch mechanism as well as to the switch points until the cross or ground has been found and corrected, and therefore maintains the integrity and security necessary in a railway switch operation.

Let us assume that the condition of the various elements is as shown in the drawing, that a reverse command has been requested, and that a cross exists between the outside wires NW and RW, as shown by the dotted line 27. As previously mentioned, under this condition the proper polarity of voltage is applied to the control circuit so that current flows from the positive terminal of the supply source through wire N–WR1, the winding of the reverse control relay RWR, wire N–RWR, over the back contact a of relay NWR, through wire –WR, over the back contact a and contact arm 20 of the overload relay OR, through the wire –WR1 and back to the negative terminal of the supply source. Accordingly, the relay RWR is effectively energized and becomes picked up so that the back contacts a and d are opened and the front contacts b and c are closed. However, as previously mentioned, this directional flow of current has no effect on the normal control relay NWR, and therefore the back contacts a and d remain closed and the front contacts b and c remain open. It will be noted that upon closing of the front contacts b and c of the reverse control relay RWR, the upper battery terminal BH110 and terminal CH110 are short-circuited over a circuit extending from terminal BH110 through fuse 21, over front contact *b* of relay RWR, through wire RW, through the cross existing between wires RW and NW, through wire NW, over back contact *d* of relay NWR, through wire CW1, over front contact *c* of relay RWR, back to terminal CH110 of the motor supply source. Under this shorted condition the fuse 21 instantly blows and immediately interrupts the reverse motor operating circuit so that the motor M is incapable of unlocking and moving switch SW. Accordingly, the switch remains locked in its reverse position and is incapable of being moved until the cross has been removed and the fuse 21 has been replaced. It will be noted that a similar operation occurs to the normal motor operating circuit during the existence of a cross or ground on the outside wires NW and RW. For example, the lower terminal BH110 and terminal CH110 of the motor supply source are now short-circuited over a circuit extending from terminal BH110, through fuse 22, wire NW1, over front contact *b* of relay NWR, through wire NW, the cross existing between wire NW and wire RW, through wire RW, over back contact *d* of relay RWR, through wire CW, over front contact *c* of relay NWR, back to terminal CH110. This short circuit instantaneously blows fuse 22 and immediately interrupts the normal motor operating circuit so that no movement of the switch points can occur until the cross has been removed and the blown fuse 22 has been replaced. The identical type of operation occurs in case the wires RW and NW are grounded. Accordingly, the switch is protected against cross and ground conditions which would normally and possibly result in damage to equipment and danger to individuals.

Thus I have disclosed a unique circuit arrangement which provides protection against cross and ground conditions, prevents inadvertent shorting of the motor supply source, and safeguards the motor against overload conditions.

Although I have shown and described my invention in relation to a railway switch environment, it is readily evident that the invention is not merely limited thereto but may be employed in other applications and facilities which have need of my invention. For example, my invention may be utilized in a railway barrier control environment wherein bidirectional motor movement is neccessary and adequate protection against cross and ground is necessary for insuring the utmost in safety. But regardless of the manner in which the invention is used, it is understood that various other applications may be made by persons skilled in the art without departing from the spirit and scope of this invention.

I claim:

1. A circuit protection arrangement for a motor supply circuit having a reversible motor and a source of energy, said motor supply circuit having at least two outside and one common wire, means electrically interconnected with said motor supply circuit for selectively controlling the supply of energy from said source over a selected one of said two outside wires and said one common wire to said reversible motor for causing rotation of the motor armature, and means cooperatively associated with said motor supply circuit for electrically interrupting said motor supply circuit thereby preventing rotational movement of said motor armature when a cross or ground fault exists on said outside wires of said motor supply circuit.

2. A circuit protection arrangement as defined in claim 1, wherein said interrupting means includes a fuse means connected between said source of energy and said reversible motor and a closed circuit means connected to said motor supply circuit which establishes a short circuit path across said source of energy when a cross or ground fault exists on said motor supply circuit for blowing said fuse means.

3. A circuit protection arrangement as defined in claim 1, wherein said reversible motor comprises a split field direct current motor.

4. A circuit protection arrangement as defined in claim 3, wherein said motor supply circuit comprises a three-wire system for supplying energy to said split field motor.

5. A circuit protection arrangement as defined in claim 4, wherein said three-wire system has one outside wire connected to one field winding of said split field motor and has the other outside wire connected to the other field winding of said split field motor and has a common wire connected to the armature of said split field motor thereby forming normal and reverse motor operating circuits.

6. A circuit protection arrangement as defined in claim 5, wherein said control means includes a first relay having a plurality of contacts connected to said normal motor operating circuit and a second relay having a plurality of contacts connected to said reverse motor operating circuit.

7. A circuit protection arrangement as defined in claim 5, wherein said first and second relays are of the polar biased type having slow release and magnetic contact blowout features and are interconnected in multiple over associated back contacts for insuring that each relay is deenergized and released prior to permitting energization of the other relay.

8. A circuit protection arrangement as defined in claim 6, wherein said plurality of contacts of said first relay include a pair of front contacts connected to the outside wire and common wire and a back contact connected between the outside wire and the common wire of said normal motor operating circuit, and said plurality of contacts of said second relay include a pair of front contacts connected to the outside wire and the common wire and a back contact connected between the outside wire and the common wire of said reverse motor operating circuit.

9. A circuit protection arrangement as defined in claim 6, wherein said three-wire system includes an overload relay having a thermal resistor and an operating winding in multiple connected in series with said motor armature for effectively deenergizing said normal and reverse motor operating circuit during an overload condition.

10. A circuit protection arrangement as defined in claim 8, wherein said motor supply circuit includes a diode serially connected between the field winding and the armature of said normal and reverse motor operating circuits for preventing the possibility of simultaneously energizing the field windings over the back contacts of said first and second relay interconnected with said normal and reverse motor operating circuit.

11. A circuit protection arrangement as defined in claim 9, wherein said overload relay includes a stick winding and a make-before-break contact electrically interconnected with said first and second relays for effectively interrupting said control means during a motor overload condition.

12. A circuit protection arrangement as defined in claim 8, wherein said interrupting means includes fusible means connected to said outside wires of said normal and reverse motor operating circuit and said back contacts of said normal and reverse motor operating circuits for short circuiting said source of energy and for destroying said fusible means when a cross or ground fault exists on said outside wires of said normal and reverse motor operating circuits.

13. In an electrically operated railway switch machine having switch points movable between a normal and a reverse position, a reversible motor for moving the switch points between their normal and reverse positions, a motor supply circuit having a normal motor operating circuit and a reverse motor operating circuit, a control circuit having a first and a second relay each responsive to a different polarity of control voltage, each of said relays having a pair of front contacts electrically connected to and a back contact electrically connected across said normal and reverse motor operating circuits, respectively, said motor supply circuit having interrupting means for opening the motor operating circuit when a cross or ground fault exists on said normal and reverse motor operating circuits.

14. An electrically operated railway switch machine as defined in claim 13, wherein said interrupting means includes a fuse element electrically connected to said normal and reverse motor operating circuits which is short circuited over the back contact of said relays for opening the motor operating circuit.

15. An electrically operated railway switch machine as defined in claim 13, wherein said motor supply circuit includes an overload relay common to said normal and reverse motor operating circuit which deenergizes the motor operating circuit during an overload condition.

16. An electrically operated railway switch machine as defined in claim 13, wherein said reversible motor comprises a split field motor having one field winding electrically connected to said normal motor operating circuit and the other field winding electrically connected to said reverse motor operating circuit and the armature electrically connected in common with said normal and reverse motor operating circuits.

17. An electrically operated railway switch machine as defined in claim 16, wherein said normal motor operating circuit includes a diode electrically interconnected between said one field winding and said armature and said reverse motor operating circuit includes a diode electrically interconnected between said other field winding and said armature for preventing the possibility of simultaneously energizing said normal and reverse motor operating circuits.

18. An electrically operated railway switch machine as defined in claim 13, wherein said first and second relays each are shunted by a resistor to provide slow release, include magnetic contact blowout and are electrically connected in multiple over a back contact of each respective relay for insuring that said relays are incapable of being picked up simultaneously thereby preventing the possibility of inadvertently short circuiting the motor supply energy source.

19. An electrically operated railway switch machine as defined in claim 17, wherein said motor control circuit includes a fuse electrically interconnected in said normal motor operating circuit for interrupting said normal motor control circuit when a cross or ground exists on said normal and reverse motor operating circuits and includes a fuse electrically interconnected in said reverse motor operating circuit for interrupting said reverse motor operating circuit when a cross or ground fault exists on said normal and reverse motor operating circuits.

20. In an electrically operated railway switch machine having switch points movable between two extreme positions, a split field motor having a pair of field windings and an armature for moving the switch points between their two extreme positions, a normal and a reverse operating circuit for said motor, a control circuit having a reversible polarity voltage source and a first and a second polar biased relay connected in multiple over associated back contacts of the respective relays, said first relay having a pair of front contacts electrically connected to and a back contact electrically connected across said normal operating circuit, said second relay having a pair of front contacts electrically connected to and a back contact electrically connected across said reverse operating circuit, an overload relay having a thermal resistor and an operating winding in multiple electrically connected in common with said normal and reverse operating circuits, said overload relay having a front contact, a stick winding and a make-before-break contact arrangement electrically connected to said control circuit, a fuse element electrically connecting said normal and reverse operating circuits to a motor supply source, a circuit controller having a plurality of motor contacts electrically interconnected with said normal and reverse operating circuits, and a diode having its anode electrically connected to the field winding and having its cathode electrically connected to motor contacts of the respective normal and reverse operating circuits.

References Cited
UNITED STATES PATENTS

| | | |
|---|---|---|
| 2,208,429 | 7/1940 | O'Hagan. |
| 2,347,602 | 4/1944 | Johnston _____ 246—219 |
| 2,389,396 | 11/1945 | Winchester _____ 317—10 XR |
| 2,637,843 | 5/1953 | Kammerdiener ____ 307—94 XR |
| 2,758,255 | 8/1956 | Lytle _____ 317—18 XR |
| 3,071,718 | 1/1963 | Gordon _____ 317—13 XR |
| 3,229,163 | 1/1966 | Rogers _____ 317—18 |
| 3,278,803 | 10/1966 | Frakes et al. _____ 317—18 |
| 3,287,603 | 11/1966 | Sosnoski _____ 317—18 |
| 3,296,493 | 1/1967 | Whittaker et al. _____ 317—18 |
| 2,098,707 | 11/1937 | MacGregor et al. _____ 243—3 |

ARTHUR L. LA POINT, *Primary Examiner.*

U.S. Cl. X.R.

317—10, 18